(12) United States Patent
Takeda et al.

(10) Patent No.: US 11,239,976 B2
(45) Date of Patent: Feb. 1, 2022

(54) RECEIVING DEVICE AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 19 days.

(21) Appl. No.: 16/606,187

(22) PCT Filed: Apr. 20, 2017

(86) PCT No.: PCT/JP2017/015938
§ 371 (c)(1),
(2) Date: Oct. 17, 2019

(87) PCT Pub. No.: WO2018/193593
PCT Pub. Date: Oct. 25, 2018

(65) Prior Publication Data
US 2020/0136783 A1 Apr. 30, 2020

(51) Int. Cl.
*H04L 5/00* (2006.01)
*H04L 1/18* (2006.01)

(52) U.S. Cl.
CPC .......... *H04L 5/0055* (2013.01); *H04L 1/1812* (2013.01); *H04L 5/0007* (2013.01)

(58) Field of Classification Search
CPC . H04L 1/00; H04L 1/16; H04L 1/1812; H04L 5/0007; H04L 5/0055; H04W 28/04; H04W 28/18
See application file for complete search history.

(56) References Cited

U.S. PATENT DOCUMENTS

| | | | |
|---|---|---|---|
| 2011/0080975 A1 | 4/2011 | Toda et al. | |
| 2011/0296275 A1 | 12/2011 | Kishigami et al. | |
| 2012/0320805 A1* | 12/2012 | Yang | H04L 1/1861 370/280 |

(Continued)

FOREIGN PATENT DOCUMENTS

| | | |
|---|---|---|
| JP | 2012-124588 A | 6/2012 |
| JP | 2016-509784 A | 3/2016 |

(Continued)

OTHER PUBLICATIONS

International Search Report issued in PCT/JP2017/015938 dated Jul. 25, 2017 (2 Pages).
Written Opinion of the International Searching Authority issued in PCT/JP2017/015938 dated Jul. 25, 2017 (4 Pages).
Zte et. al.; "Consideration on Outer Codes for NR"; 3GPP TSG-RAN WG1 #86bis, R1-1608976; Lisbon, Portugal, Oct. 10-14, 2016 (9 Pages).

(Continued)

*Primary Examiner* — Khaled M Kassim
(74) *Attorney, Agent, or Firm* — Osha Bergman Watanabe & Burton LLP

(57) ABSTRACT

The present invention is designed to reduce the delay time to transmit delivery acknowledgment information as feedback in response to data channels. According to one aspect of the present invention, a receiving device has a receiving section that receives one or more code blocks mapped per given number of symbols, in a slot in which a data signal is scheduled, and a control section that controls the transmission of delivery acknowledgment information in response to the data signal in the slot, based on the decoding results of the code blocks mapped per given number of symbols.

2 Claims, 13 Drawing Sheets

(56) References Cited

U.S. PATENT DOCUMENTS

| | | | | |
|---|---|---|---|---|
| 2013/0195031 A1* | 8/2013 | Hessler | ................ | H04L 1/1819 370/329 |
| 2013/0229958 A1 | 9/2013 | Sagae et al. | | |
| 2013/0343322 A1* | 12/2013 | Lee | ....................... | H04J 13/004 370/329 |
| 2015/0358111 A1 | 12/2015 | Marinier et al. | | |
| 2018/0027554 A1* | 1/2018 | Yerramalli | ............ | H04L 5/0055 370/329 |
| 2018/0254877 A1* | 9/2018 | Wang | ................... | H04L 1/1861 |
| 2019/0020445 A1* | 1/2019 | Kim | ....................... | H04L 1/1861 |
| 2019/0132079 A1* | 5/2019 | Saito | ..................... | H04W 28/06 |
| 2019/0191487 A1* | 6/2019 | Kwon | .................. | H04W 76/27 |
| 2019/0254022 A1* | 8/2019 | Yeo | .................. | H04W 72/0413 |
| 2019/0327024 A1* | 10/2019 | Lee | ..................... | H04L 27/2628 |
| 2020/0067651 A1* | 2/2020 | Takeda | .................. | H04L 1/1887 |
| 2020/0106559 A1* | 4/2020 | Vilaipornsawai | .... | H04B 7/0697 |

FOREIGN PATENT DOCUMENTS

| | | |
|---|---|---|
| WO | 2009-157184 A1 | 12/2009 |
| WO | 2010/087197 A1 | 8/2010 |

OTHER PUBLICATIONS

Qualcomm Incorporated; "DL processing time consideration"; 3GPP TSG-RAN WG1 #86b, R1-1610181; Lisbon, Portugal, Oct. 10-14, 2016 (9 Pages).

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).

Extended European Search Report issued in Application No. 17906548.7, dated Oct. 15, 2020 (11 pages).

3GPP TSG-RAN WG1 Meeting #86; R1-167070; "On processing time reduction between PDSCH transmission and DL HARQ feedback;" Nokia, Alcatel-Lucent Shanghai Bell; Aug. 22-26, 2016; Gothenburg, Sweden (8 pages).

3GPP TSG RAN WG1 Meeting #88bis; R1-1705066; "Discussion on CBG-based feedback and retransmission;" Huawei, HiSilicon; Apr. 3-7, 2017; Spokane, USA (4 pages).

3GPP TSG RAN WG1 Meeting #88bis; R1-1704926; "Discussion on coding chain for eMBB data transmission;" LG Electronics; Apr. 3-7, 2017; Spokane, USA (5 pages).

* cited by examiner

RECEIVING DEVICE AND RADIO COMMUNICATION METHOD

TECHNICAL FIELD

The present invention relates to a receiving device and a radio communication method in next-generation mobile communication systems.

BACKGROUND ART

In the Universal Mobile Telecommunications System (UMTS) network, the specifications of long-term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th Generation mobile communication system)," "NR (New RAT (Radio Access Technology))," "LTE Rel. 14 and later versions," etc.) are under study.

In existing LTE systems (for example, Rel. 13 and earlier versions), adaptive modulation and coding (AMC), in which at least one of the modulation scheme, the transport block size (TBS), and the coding rate is changed adaptively, is executed for link adaptation. Here, TBS refers to the size of transport blocks (TBs), which are units of information bit sequences. One or more TBs are assigned to 1 subframe.

Also, when, in existing LTE systems, TBS exceeds a predetermined threshold (for example, 6144 bits), a TB is segmented into one or more segments (code blocks (CBs)), and coding is done on a per segment basis (code block segmentation). Each encoded CB is concatenated and transmitted.

Moreover, in existing LTE systems, retransmission (HARQ (Hybrid Automatic Repeat reQuest)) of data signals (for example, "PDSCH (Physical Downlink Shared CHannel)" and/or "PUSCH (Physical Uplink Shared CHannel)," "DL data" and/or "UL data," "DL data channel" and/or "UL data channel," "DL shared channel" and/or "UL shared channel," etc.) is controlled in units of TBs.

To be more specific, in existing LTE systems, regardless of whether a TB is segmented into multiple CBs or not, delivery acknowledgment information (also referred to as "ACK (ACKnowledgment) or NACK (Negative ACK)," "ACK/NACK," "A/N or HARQ-ACK," etc.) is transmitted, per TB, a predetermined time (for example, after 4 ms) a data signal is scheduled in a transmission time interval (also referred to as a "TTI," a "subframe," etc.).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, 5G or NR), for example, in order to support high reliability and/or low latency communications (for example, URLLC (Ultra-Reliable and Low Latency Communication)), there is a need to transmit delivery acknowledgment information in response to data signals, as feedback, with a shorter delay time than existing LTE systems (for example, LTE Rel. 13 and earlier versions).

For example, envisaging future radio communication systems, research is underway to transmit delivery acknowledgment information in response to data signals as feedback (also referred to as "self-contained operation," "self-contained slot," "self-contained transmission time interval (TTI)," etc.) within a slot in which a data signal is scheduled.

However, in existing LTE systems (LTE Rel. 13 and earlier versions), a data signal starts being processed (for example, demodulated and/or decoded) after the TTI where the data signal is scheduled is over. Therefore, when a data signal is processed as in existing LTE systems, there is a possibility that it is not possible to transmit delivery acknowledgment information in response to this data, as feedback, within the delay time required for future radio communication systems (for example, 5G or NR).

The present invention has been made in view of the above, and it is therefore an object of the present invention to provide a receiving device and a radio communication method, whereby the delay time for transmitting delivery acknowledgment information in response to data signals as feedback can be reduced.

Solution to Problem

According to one aspect of the present invention, a receiving device has a receiving section that receives one or more code blocks mapped per given number of symbols, in a slot in which a data signal is scheduled, and a control section that controls the transmission of delivery acknowledgment information in response to the data signal in the slot, based on the decoding results of the code blocks mapped per predetermined number of symbols.

Advantageous Effects of Invention

According to the present invention, the delay time for transmitting delivery acknowledgment information in response to data signals as feedback can be reduced.

DESCRIPTION OF EMBODIMENTS

Figure 1:
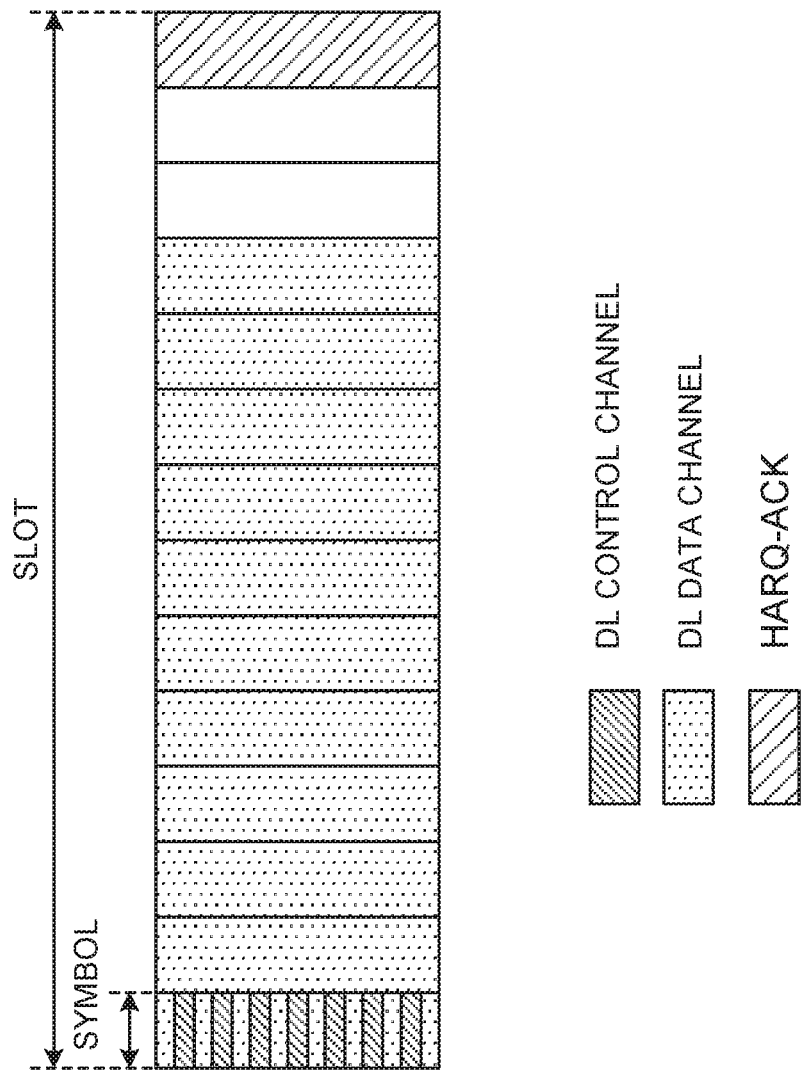
FIG. 1 is a diagram to show an example of slot configuration for use in future radio communication systems.

FIG. 1 is a diagram to show an example of slot (also referred to as "TTI" or the like) configuration for use in future radio communication systems (for example, 5G, NR, etc.). Note that, although 1 slot is comprised of 14 symbols in FIG. 1, the number of symbols in 1 slot is not limited to that shown in FIG. 1. Also, the time length (slot length) of 1 slot may vary depending on subcarrier spacing and/or the number of symbols in 1 slot. Subcarrier spacing is, for example, assumed to be 15 kHz, 30 kHz, 60 kHz, 120 kHz, etc. Given that subcarrier spacing and symbol duration are reciprocal, if the subcarrier spacing widens while the number of symbols in 1 slot is equal, the slot length becomes shorter.

In FIG. 1, a DL data channel (for example, PDSCH) and a UL control channel (for example, PUCCH (Physical Uplink Control CHannel)) are time-division-multiplexed (TDM). In the UL control channel, uplink control information (UCI) including delivery acknowledgment information (ACK/NACK, A/N or HARQ-ACK, etc.) in response to the DL data channel is transmitted. In this way, transmitting HARQ-ACK in response to a DL data channel as feedback in the same slot as that of the DL data channel is referred to as "self-contained operation," "self-contained slot," etc.

As shown in FIG. 1, a DL control channel may be time-division-multiplexed (TDM) and/or frequency-division-multiplexed (FDM) over a DL data channel (for example, PDCCH (Physical Downlink Control CHannel)). Downlink control information (DCI) is transmitted in the DL control channel, and a user terminal controls the receiving processes for the DL data channel (for example, at least one of receipt, demodulation and decoding) based on this DCI.

Note that, though not illustrated, demodulation reference signals (also referred to as "DMRS," "DL-DMRS," etc.) for the DL control channel and/or the DL data channel may be multiplexed in the slot shown in FIG. 1. Similarly, the demodulation reference signal (also referred to as "DMRS," "UL-DMRS," etc.) for a UL control channel may be multiplexed.

Also, as illustrated in FIG. 1, a time (gap period) to switch from DL to UL may be provided between a DL data channel and a UL control channel. Also, a time (gap period) to switch UL and DL may be also provided between a UL control channel and the time the next frame (subframe or TTI) starts. Alternatively, it is equally possible not to provide an explicit gap period between a UL control channel and the next slot, in the channel format, and, in actual operation, a gap period may be configured depending on what timing advance (TA) is applied to UL signals.

Now, in existing LTE systems (for example, LTE Rel. 13 and earlier versions), code block (CB) segmentation is supported. In CB segmentation, a transport block (TB) is divided into one or more code blocks (CBs) (also referred to as "segments," "subblocks," etc.) and encoded in units of CBs.

Figure 2:
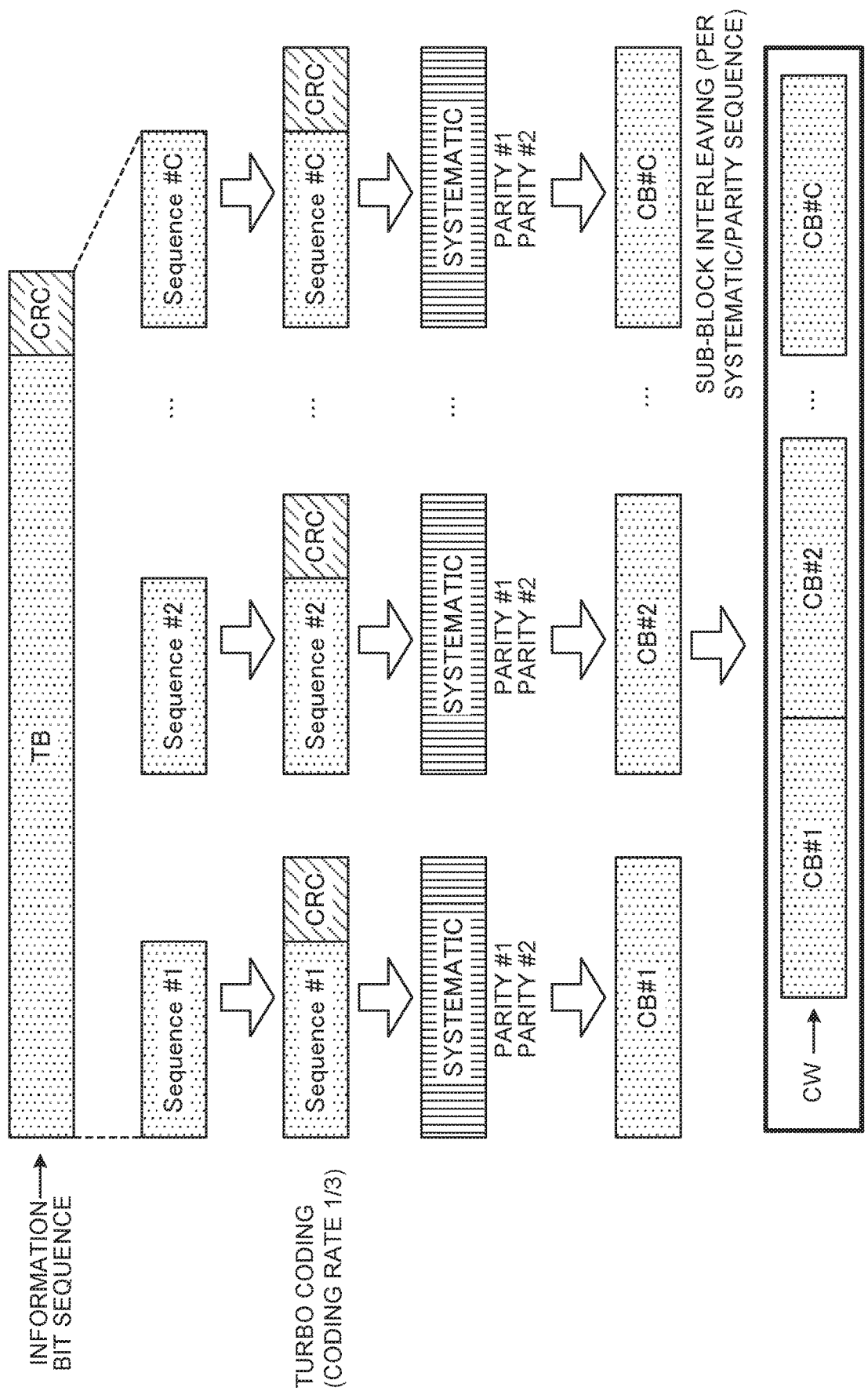
FIG. 2 is a diagram to show an example of transmission process when CB segmentation is used.

FIG. 2 is a diagram to show an example of transmission process where CB segmentation is used. Referring to FIG. 2, if a TB (an information bit sequence including CRC bits), to which CRC (Cyclic Redundancy Check) bits are appended, exceeds a predetermined threshold, this TB is segmented into a plurality of segments. Note that this predetermined threshold is the maximum CB size in accordance with the coding scheme, and may be, for example, 6144 bits when turbo coding is used, and 8192 bits when low-density parity-check code (LDPC) is used. Also, filler bits may be added to the top of segment #1.

As shown in FIG. 2, CRC bits (for example, 24 bits) are added to each segment, channel coding is performed based on predetermined coding schemes (for example turbo coding or LDPC) at predetermined coding rates (for example, ⅓, ¼, ⅛, etc.). By means of this channel coding, systematic bits and parity bits (for example, the first and second parity bits (#1 and #2)) are generated as code bits of each CB.

Each CB is interleaved in a predetermined manner, and a bit sequence of a volume to match the amount of scheduled resources is selected and transmitted. For example, the systematic bit sequence, the first parity bit sequence and the second parity bit sequence are all interleaved individually (subblock interleaving). After this, the systematic bit sequence, the first parity bit sequence and the second parity bit sequence are each input to a buffer (circular buffer), and, based on the number of REs that are available for use in allocated resource blocks, the redundancy version (RV) and so on, the code bits for each CB are selected from the buffer (rate matching). Interleaving may be applied between multiple CBs as well.

Each CB, formed with selected code bits, is concatenated to form a codeword (CW). The codeword is subjected to scrambling, data modulation and so on, and then transmitted.

Figure 3:
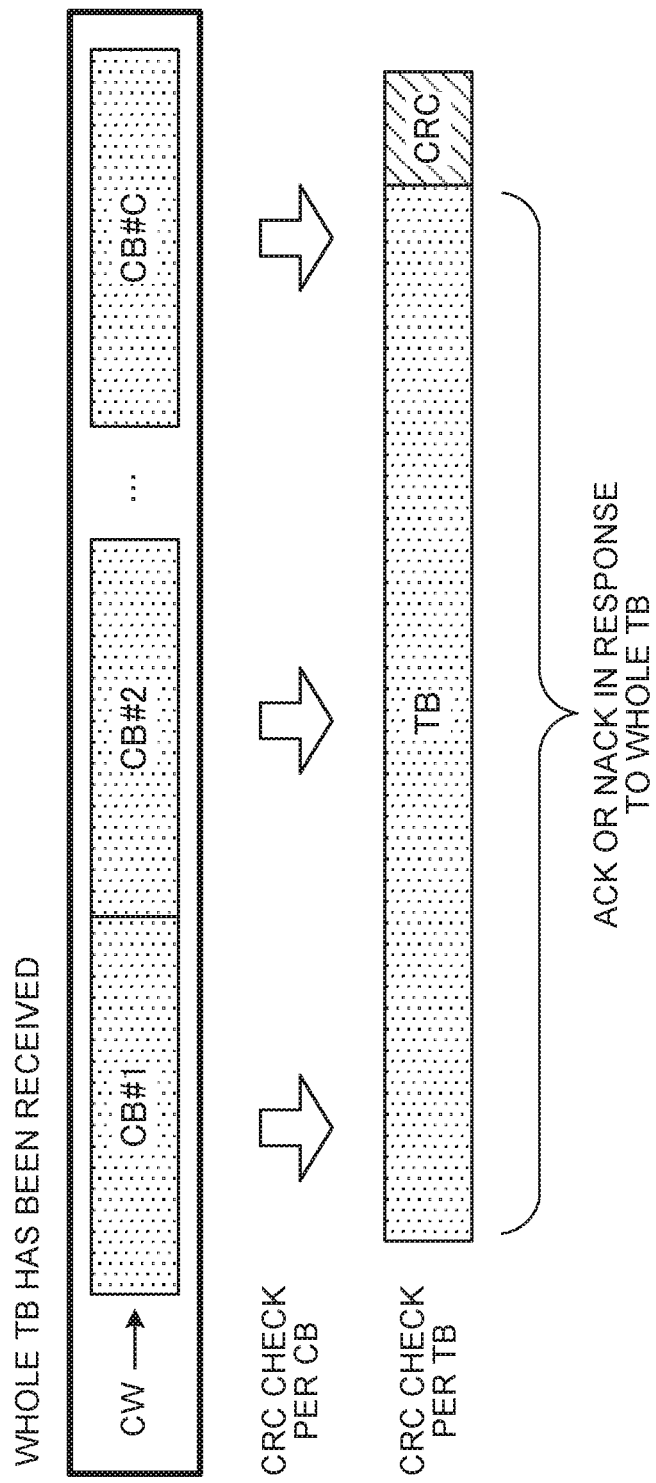
FIG. 3 is a diagram to show an example of receiving process when CB segmentation is used.

FIG. 3 is a diagram to show an example of receiving process where CB segmentation is used. On the receiving side, a TBS index is selected based on the MCS index included in DCI. Also, TBS is selected based on this TBS index and the number of frequency resources allocate by that DCI (for example, the number of physical resource blocks (also referred to as "PRBs," "resource blocks" etc.)). Also, the number of CBs is determined based on this TBS.

As shown in FIG. 3, on the receiving side, each CB is decoded, and error detection for each CB is performed by using the CRC bits appended to each CB. Also, code block segmentation is undone, so as to recover the TB. Furthermore, error detection of the whole TB is performed using the CRC bits appended to the TB.

When the above existing LTE systems (for example, LTE Rel. 13 and earlier versions) are used, cases might occur where each CB is mapped over multiple symbols, and/or cases might also occur where each of multiple CBs is partly mapped in the same symbol. For this reason, in existing LTE systems, each CB that constitute a TB starts being processed (for example, demodulated and/or decoded (hereinafter also referred to as "demodulation/decoding")) only after the TTI (also referred to as "subframe," etc.) in which this TB is scheduled is over. Note that decoding is also referred to as "error detection" or the like. Depending on the decoding result of each CB, an HARQ-ACK in response to the TB as a whole is transmitted to the transmitting side, as feedback, a predetermined time (for example, 4 ms) or more after the above TTI.

Meanwhile, envisaging future radio communication system (for example, 5G or NR etc.), in order to support high reliability and/or low latency communication (for example, URLLC), it is desirable to transmit HARQ-ACK, as feedback, with a shorter delay time than existing LTE systems (for example, LTE Rel. 13 and earlier versions).

However, the premise of existing LTE systems (LTE Rel. 13 and earlier versions) is that HARQ-ACK is transmitted as feedback 4 ms or more after the TTI in which a data signal (for example, PDSCH and/or PUSCH) is scheduled, so that, after this TTI is over, one or more CBs that constitute the data signal (for example, TB of PDSCH and/or PUSCH) start being processed (for example, demodulated/decoded). Therefore, when data signals are processed in the same way as in existing LTE systems (LTE Rel. 13 and earlier versions), there is a possibility that it is not possible to send feedback of delivery acknowledgment information in response to the data within the delay time (for example, self-contained TTI) permitted in future radio communication systems (for example, 5G or NR).

So, the present inventors have come up with the idea that, when a data signal is divided into one or more CBs, one or more CBs may be mapped per given number of symbols (for example, 1 symbol), so as to make it possible to process (for example, demodulate/decode) the CBs received in the previous symbol and receive the CBs in the following symbol in parallel (pipeline processing), and shorten the delay time required for HARQ-ACK feedback.

Now, embodiments of the present invention will be described below in detail with reference to the accompanying drawings. In the following, the present embodiment will be described with a focus on the operation in which a user terminal receives a data signal (also referred to as "DL data," "PDSCH," "DL data channel" or "DL shared channel," etc.), and transmits HARQ-ACK, as feedback, in response to that data signal. Note that the present embodiment is also applicable to the case in which a radio base station receives a data signal (also referred to as "UL data," "PUSCH," "UL data channel" or "UL shared channel," etc.) and transmits HARQ-ACK in response to the data signal as feedback.

That is, in the present embodiment, the receiving device that receives one or more CBs mapped per given number of symbols in a slot in which a data signal is scheduled may be a user terminal if the data signal is DL data, or may be a radio base station if the data signal is UL data. The transmitting device that transmits one or more CBs mapped per given number of symbols in the above slot may be a radio base station if the data signal is DL data, or may be a user terminal if the data signal is UL data.

Figure 4:
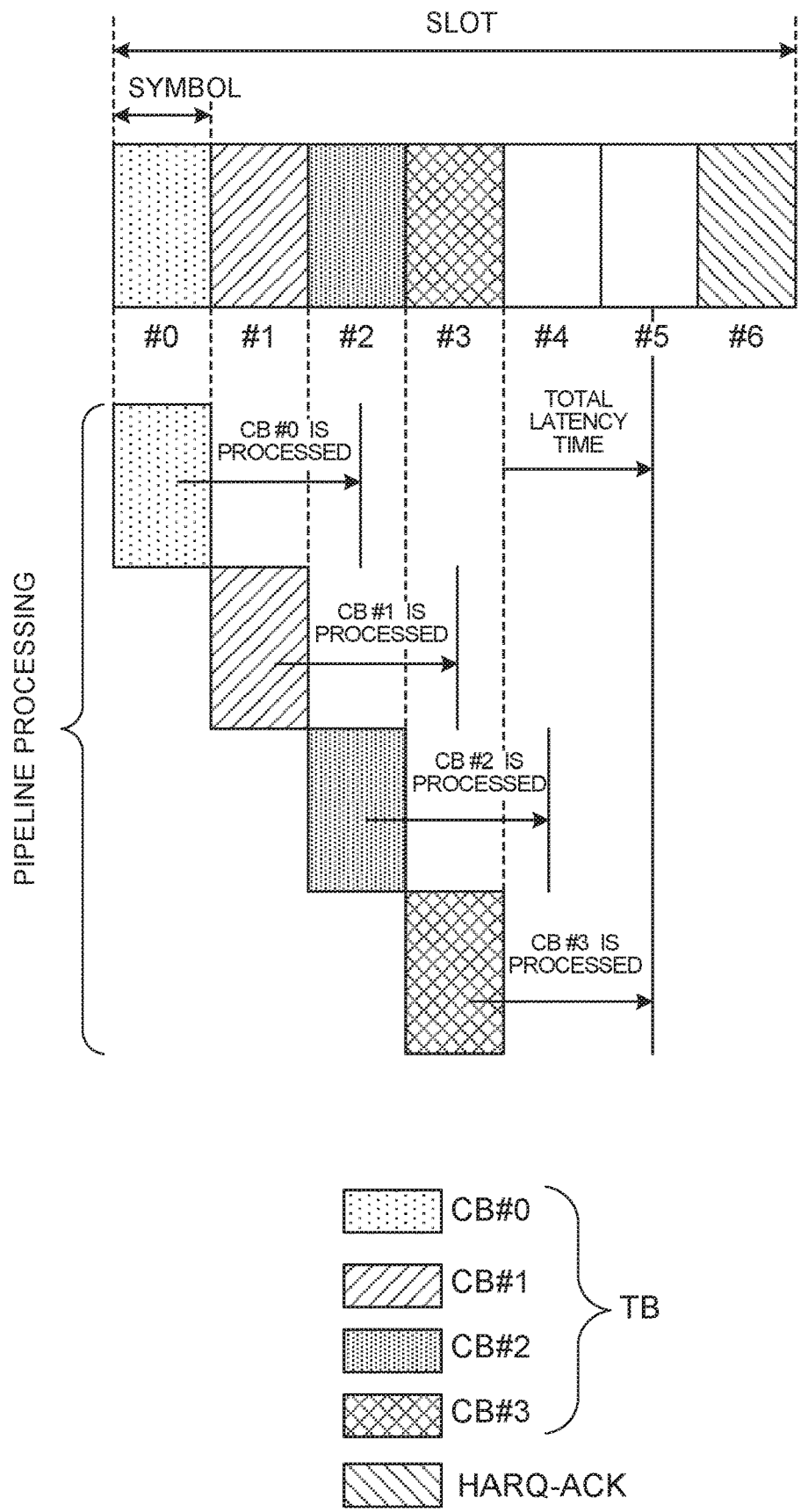
FIG. 4 is a diagram to show an example of pipeline processing according to the present embodiment.
Figure 5A:
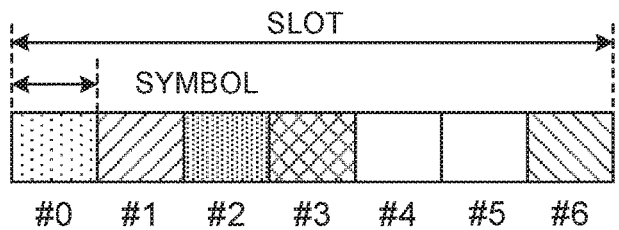
FIGS. 5A to 5D are diagrams to show examples of CB mapping according to a first example of the present invention.
Figure 5B:
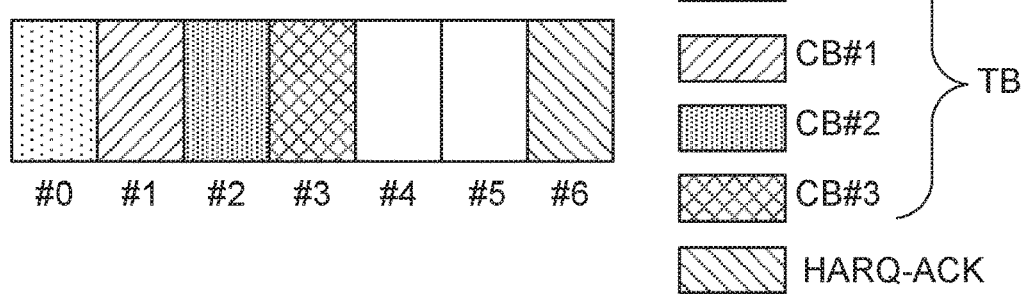
Figure 5C:
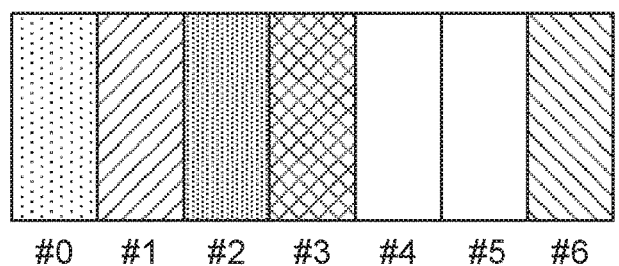
Figure 5D:
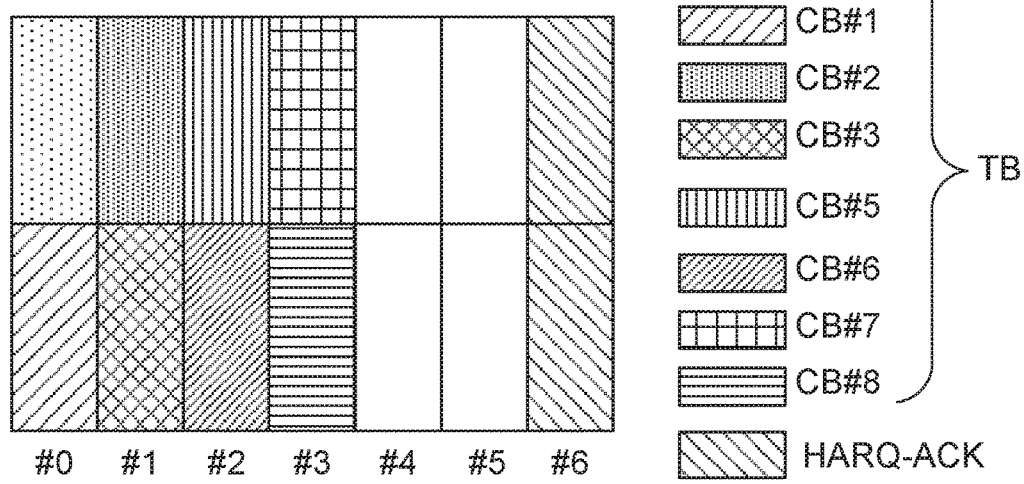

FIG. 4 is a diagram to show an example of pipeline processing according to the present embodiment. As shown in FIG. 4, when 1 TB is segmented into a number of CBs, one or more CBs are mapped to each symbol (that is, 1 CB is not mapped over multiple symbols).

For example, referring to FIG. 4, 1 TB is segmented into CBs #0 to #3, and these CBs #0 to #3 are mapped to different symbols #0 to #3, respectively. CB #0, which is received in symbol #0, is processed (for example, demodulated/decoded) within 1.5 symbols from the top of symbol #1. Similarly, CBs #1 to #3, received in symbols #1 to #3, are processed (for example, demodulated/decoded) within 1.5 symbols from the top of symbols #2 to #4, respectively.

In this way, in symbol #1 of FIG. 4, the processing (for example, demodulation/decoding) of CB #0, which is received in previous symbol #0, and the receipt of CB #1 take place in parallel. Also, in symbol #2, the processing of CBs #0 and #1 and the receipt of CB #2 take place in parallel. Furthermore, in symbol #3, the processing of CBs #1 and #2 and the receipt of CB #3 take place in parallel. In this way, when pipeline processing is carried out per symbol, the delay time it takes to demodulate/decode all of CBs #0 to #3 is equivalent to 1.5 symbols, which is the time it takes to demodulate/decode CB #3 from the top of symbol #4.

It is generally understood that the time it takes to process (for example, demodulate/decode) data is 1.5 times the time it takes to receive this data. If demodulation/decoding starts after all of CBs #0 to #3 have been received, the delay time it takes to demodulate/decode all of CBs #0 to #3 is equivalent to 6 symbols from the top of symbol #4. Therefore, as shown in FIG. 4, when pipeline processing is carried out per symbol, it is possible to shorten the delay time for HARQ-ACK feedback.

For example, referring to FIG. 4, HARQ-ACK, based on the decoding results of CBs #0 to #3 received in symbols #0 to #3, respectively, can be transmitted as feedback in symbol #6 in the same slot. Note that HARQ-ACK feedback may be transmitted per TB comprised of multiple CBs, per CB, or per code block group (CBG) comprised of one or more CBs.

As described above, according to the present embodiment, a user terminal maps one or more CBs to each symbol and performs pipeline processing per symbol, in order to enable transmission of HARQ-ACK feedback within the same slot ("fast HARQ-ACK," "self-contained slot," etc.). In this case, the user terminal may adjust the CB size based on the physical resources (or physical resource units) allocated to the data (TB) (first example), or determine, based on this physical resource, whether or not to transmit HARQ-ACK as feedback in the same slot (second example).

First Example

With a first example of the present invention, CB size, which is the number of bits per CB, is adjusted based on the amount of physical resources, so as not to map 1 CB over multiple symbols.

The amount of physical resources (for example, the number of bits that can be communicated within 1 symbol) is shown based on at least one of the number of PRBs, the modulation scheme, the coding rate and the number of layers (also referred to as "rank," and/or the like), for example. It then follows that, according to the first example, CB size may be controlled based on at least one of the number of PRBs, the modulation scheme, the coding rate and the number of layers.

With the first example, CB size is controlled so as to allow one or more CBs to be mapped to each symbol (to make it possible to prevent 1 CB from being mapped over multiple symbols), so that pipeline processing (see FIG. 4.) can be performed per symbol, and the delay time due to HARQ-ACK feedback can be shortened.

Furthermore, according to the first example, the code length and/or the coding rate of CBs change based on at least one of the CB size, the number of PRBs, the modulation scheme, the coding rate and the number of layers.

FIG. 5 is a diagram to show an example of CB mapping according to the first example. For example, FIGS. 5A to 5D show CBs #0 to #3 mapped to different numbers of PRBs. In FIGS. 5A to 5C, the number of PRBs mapped to CBs #0 to #3, respectively, increases, so that their CB size also increases. If the CB size exceeds the maximum CB size (for example, 6144 or 8192 bits), multiple CBs (here, 2 CBs) may be mapped to 1 symbol, as shown in FIG. 5D.

In FIG. 5, a user terminal identifies at least one of the number of PRBs allocated to DL data (TB), the modulation scheme, the coding rate, and the number of layers based on DCI. The user terminal determines the CB size based on the maximum CB size X and the number of bits Y that can be transmitted in a predetermined number of symbols (for example, 1 symbol, 2 symbols, etc.). For example, the user terminal may determine the CB size according to min (X, Y).

Here, the maximum CB size X may be, for example, 6144 bits when turbo code is used for coding, and may be 8192 bits when LDPC is used for coding. Also, the number of bits Y that can be transmitted in a predetermined number of symbols may be derived from at least one of the number of PRBs, the modulation scheme, the coding rate and the number of layers. The predetermined number of symbols may be the number of symbols to serve as a unit of pipeline processing (for example, 1 symbol in the pipeline processing shown in FIG. 4).

Also, regardless of at least one of the number of PRBs, the modulation scheme, the coding rate and the number of layers, the number of CBs included in a predetermined number of symbols may be fixed when the number of bits Y that can be transmitted in a predetermined number of symbols is smaller than X, or may be an integral multiple of that otherwise.

As described above, the CB size of CBs is subject to control, and these CBs are mapped to physical resources that are constituted by at least one of frequency resources, space resources and time resources. For example, CBs may be mapped to physical resources (1) in the order of the frequency direction, the space direction and the time direction ("frequency-first, space-second, time-third"), or (2) in the order of the space direction, the frequency direction and the time direction ("space-first, frequency-second, time-third").

Also, if part of the physical resources (for example, part of the resource elements (REs) in the PRB) allocated to data are occupied by reference signals or control channel, CBs may be subjected to rate matching or punctured based on the part of the physical resources. In this case, CB size might vary between different CBs.

As described above, according to the first example, CB size is adjusted based on the amount of physical resources, so that it is possible to prevent 1 CB from being mapped over multiple symbols. As a result of this, high-speed HARQ-ACK can be realized by pipeline processing per predetermined number of symbols (for example, 1 symbol).

Second Example

As has been described above with the first example, when CB size is controlled so as to prevent 1 CB from being mapped over multiple symbols and the amount of physical resources in 1 symbol is small, the CB size becomes small. For example, if 1 PRB, QPSK, and 1 layer are combined, there is a possibility that 1 CB is 24 bits or less. A predetermined number of CRC bits (for example, 24 CRC bits) are appended to each CB, so that, when the size of CBs is made smaller to increase the number of CBs, the number of CRC bits per TB might increase, which may degrade the performance.

So with a second example of the present invention, whether or not to transmit HARQ-ACK feedback in response to a CB in the same slot is determined based on the amount of physical resources. For example, when the amount of physical resources in 1 symbol is smaller than a predetermined threshold, while it is allowed to map a CB over multiple symbols, transmitting HARQ-ACK feedback in the same slot as that of the CB has to be abandoned. On the other hand, if the amount of physical resources in 1 symbol is equal to or greater than a predetermined threshold, one or more CBs are mapped to each symbol, and HARQ-ACK is transmitted as feedback in the same slot as that of the CB.

To be more specific, according to the second example, a user terminal determines whether or not to transmit HARQ-ACK feedback within the same slot in which a CB is received, based on at least one of the number of PRBs, the modulation scheme, the coding rate and the number of layers.

For example, if at least one of the number of PRBs, the modulation scheme, the coding rate and the number of layers is a predetermined value (a predetermined combination), HARQ-ACK may be transmitted as feedback in the same slot. Meanwhile, if at least one of the number of PRBs, the modulation scheme, the coding rate and the number of layers has another value (another combination), HARQ-ACK feedback in the same slot may be suspended.

In the second example, regardless of at least one of the number of PRBs, the modulation scheme, the coding rate, and the number of layers, the code length and/or the coding rate of CBs may be fixed. Note that the code length and/or coding rate of CBs may be configured by higher layer signaling.

FIG. 6 are diagrams to show examples of mapping of CBs according to the second example. For example, in FIGS. 6A and 6B, the amount of physical resources (for example, the number of bits that can be transmitted in 1 symbol) is smaller than a predetermined threshold. Therefore, in FIGS. 6A and 6B, 1 CB is mapped over a number of symbols (here, 2 symbols). In FIGS. 6A and 6B, a user terminal cannot perform pipeline processing per symbol, so that HARQ-ACK feedback within the same slot has to be abandoned.

Figure 6A:
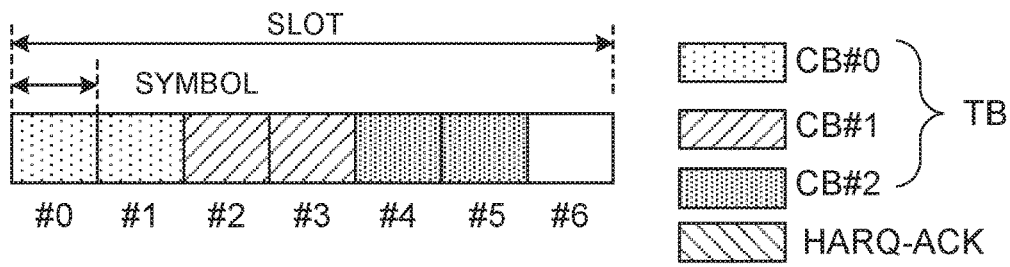
FIGS. 6A to 6D are diagrams to show examples of CB mapping according to a second example of the present invention.
Figure 6B:
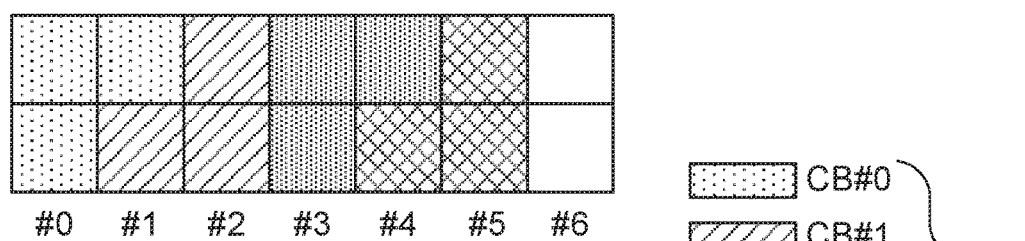
Figure 6C:
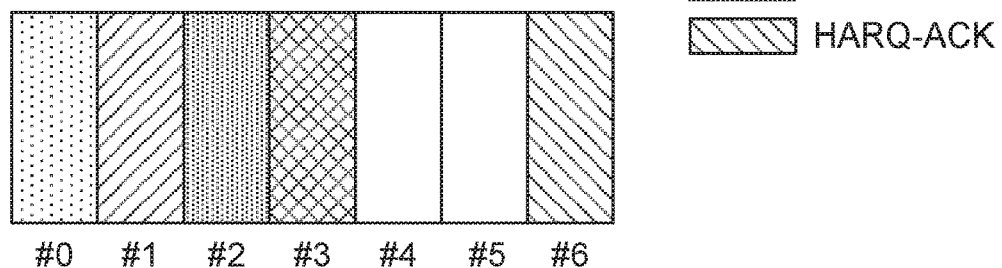
Figure 6D:
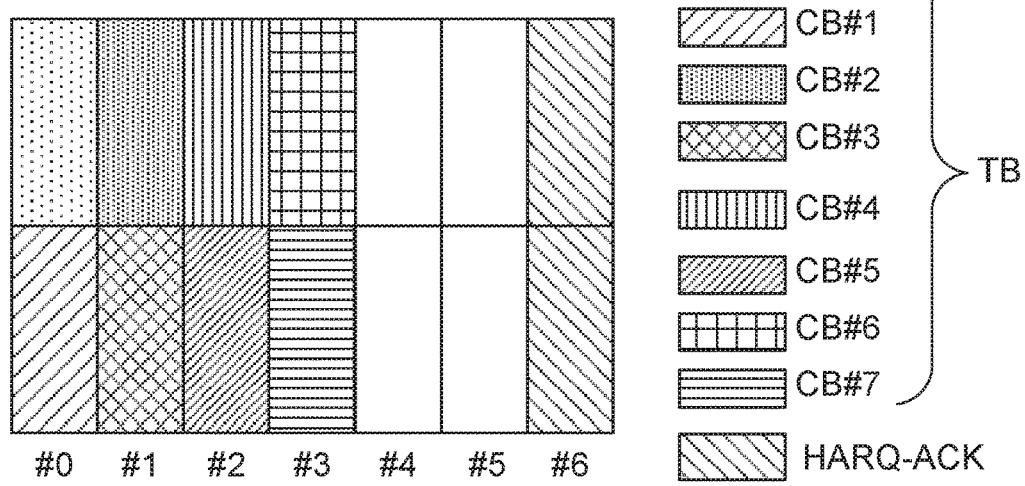

On the other hand, in FIGS. 6C and 6D, the amount of physical resources (for example, the number of bits that can be transmitted in 1 symbol) is equal to or greater than a predetermined threshold. Consequently, in FIG. 6C, 1 CB is mapped in 1 symbol. The CB size needs to be less than or equal to the maximum CB size depending on the coding scheme (for example, 6144 bits when using a turbo code, or 8192 bits when using LDPC), so that, as shown in FIG. 6D, multiple CBs (here, 2 CB) may be mapped in 1 symbol.

In FIG. 6, a user terminal identifies at least one of the number of PRBs allocated to DL data (TB), the modulation scheme, the coding rate, and the number of layers, based on DCI. The user terminal determines the CB size based on the maximum CB size X and the number of bits Y that can be transmitted in a predetermined number of symbols (for example, 10 or 12 symbols). For example, the user terminal may determine the CB size according to min (X, Y).

Here, the maximum CB size X may be, for example, 6144 bits when turbo code is used for coding, and may be 8192 bits when LDPC is used for coding. Also, the number of bits Y that can be transmitted in a predetermined number of symbols may be derived from at least one of the number of PRBs, the modulation scheme, the coding rate and the number of layers. This predetermined number of symbols may be the number of symbols to which data can be mapped (for example, 4 symbols in FIGS. 6C and 6D).

Also, the number of CBs is adjusted based on at least one of the number of PRBs, the modulation scheme, the coding rate and the number of layers (also referred to as "rank"

etc.). For example, if L CRC bits (for example, 24 bits) are appended to each CB, the user terminal may determine the number of CBs, or C, based on the number of information bits B, the maximum CB size X, and the number CRC bits L (for example, see equation 1).

$$C=|B/(X-L)| \quad \text{(Equation 1)}$$

Also, the number of bits Y may be determined based on the number of CBs C. For example, the user terminal may make the first CB size $K_+$, and select the minimum CB size K to satisfy $C \cdot K \geq B'$ from a plurality of candidate values that are provided in advance, and use this as the above-mentioned number of bits Y. Here, as for B', the user terminal may make the second CB size $K_-$, and select the minimum CB size K to satisfy $K < K_+$ from a plurality of candidate values that are provided in advance, and use this as the above-mentioned number of bits Y.

As described above, the CB size of CBs is subject to control, and these CBs are mapped to physical resources that are constituted by at least one of frequency resources, space resources and time resources. For example, CBs may be mapped to physical resources (1) in the order of the frequency direction, the space direction and the time direction ("frequency-first, space-second, time-third"), or (2) in the order of the space direction, the frequency direction and the time direction ("space-first, frequency-second, time-third").

Also, if part of the physical resources (for example, part of the resource elements (REs) in the PRB) allocated to data are occupied by reference signals or control channels, CBs may be subjected to rate matching or punctured based on the part of the physical resources. In this case, CB size might vary between different CBs.

Alternatively, the coding rate and/or the coding length may be fixed even if a part of physical resources allocated to data is occupied by the reference signal or control channel.

As described above, according to the second example, whether or not to transmit HARQ-ACK as feedback in the same slot as that of a CB is determined based on the amount of physical resources, even when the size of CBs is made smaller so as to map a CB to 1 symbol, it is possible to prevent the degradation of performance.

Other Examples

Multiple CBs can be mapped to 1 symbol as described above with the first and second examples. When multiple CBs are mapped to 1 symbol, every 1 symbol (or a set of one or more symbols) may be interleaved in the frequency direction.

Figure 7A:
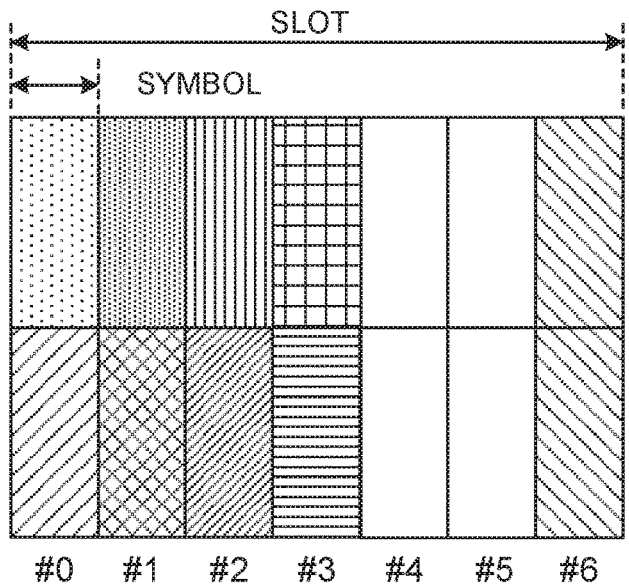
FIGS. 7A and 7B are diagrams to show examples of CB mapping according to other examples of the present invention.

FIG. 7 provide diagrams to show examples of mapping of CBs according to other examples of the present invention. Referring to FIG. 7A, CBs #0 to #7 that constitute a TB are mapped to symbols #0 to #3 every 2 CBs, (1) in the order of the frequency direction, the space direction and the time direction, (or (2) in the order of the space direction, the frequency direction and the time direction).

Figure 7B:
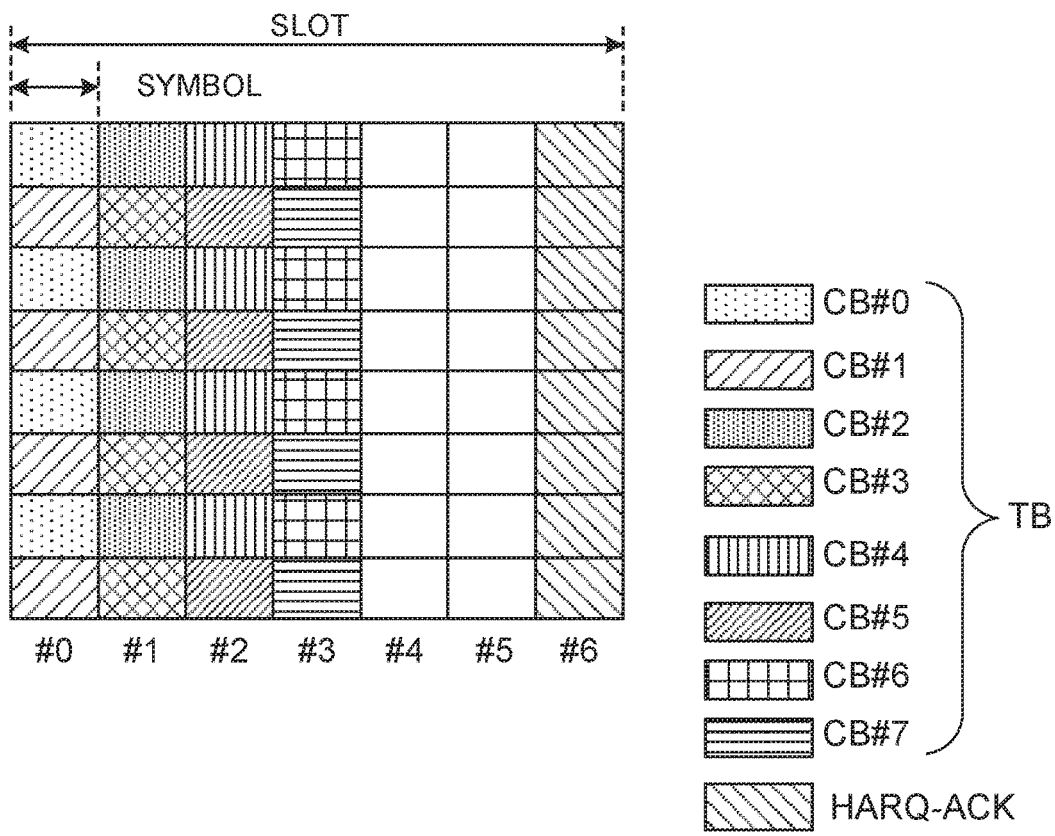

In FIG. 7B, interleaving in the frequency direction is applied to symbols #0 to #3, to which CBs #0 to #7 are mapped. As shown in FIG. 7B, the performance of decoding can be improved by applying interleaving in the frequency direction.

Also, although the above description has focused on the operation in which user terminal transmits HARQ-ACK in response to DL data as feedback, the same operation can be applied to a radio base station that transmits HARQ-ACK in response to UL data as feedback. Also, the operation of a radio base station for mapping one or more CBs of DL data to every symbol can be applied to the operation of a user terminal for mapping one or more CBs of UL data to every symbol.

In addition, although pipeline processing per symbol has been described above, the present embodiment can be applied to the case where pipeline processing is performed every two or more symbols.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 8:
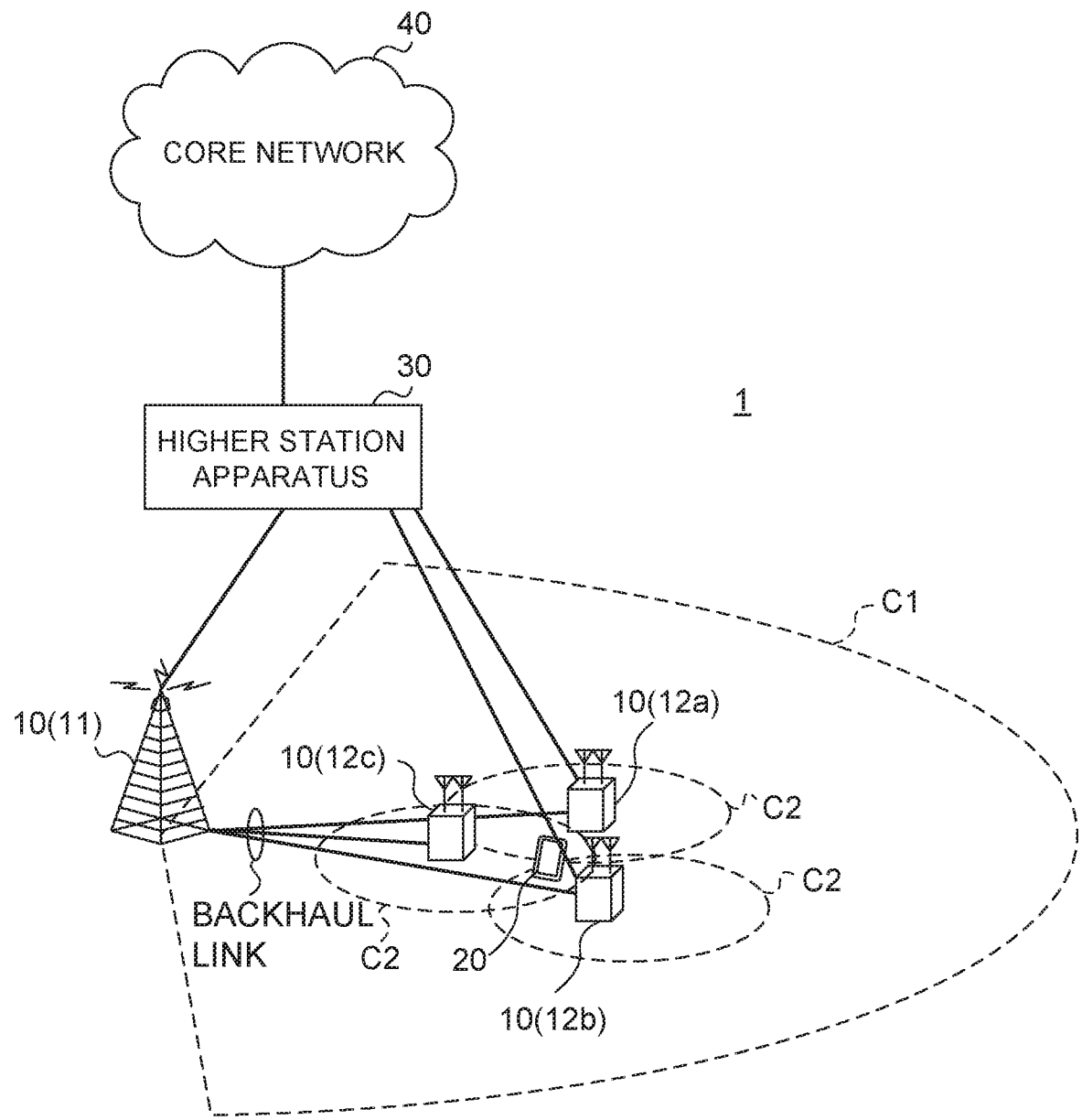
FIG. 8 is a diagram to show an exemplary schematic structure of a radio communication system according to the present invention.

FIG. 8 is a diagram to show an exemplary schematic structure of a radio communication system according to the present embodiment. A radio communication system 1 can adopt carrier aggregation (CA), which groups a number of fundamental frequency blocks (component carriers (CCs)) into one, where an LTE system bandwidth (for example, 20 MHz) is used as 1 unit, and/or dual connectivity (DC). Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 8 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A structure in which different numerologies are applied between cells may be adopted here. Note that a "numerology" refers to a set of communication parameters that characterize the design of signals in a given RAT and/or the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Also, in each cell (carrier), either subframes having a relatively long time length (for example, 1 ms) (also referred to as "TTIs," "normal TTIs," "long TTIs," "normal subframes," "long subframes," "slots," and/or the like), or subframes having a relatively short time length (also referred to as "short TTIs," "short subframes," "slots" and/or the like) may be applied, or both long subframes and short subframe may be used. Furthermore, in each cell, subframes of two or more time lengths may be used.

Between the user terminals 20 and the radio base station 11, communication can be carried out using a carrier of a relatively low frequency band (for example, 2 GHz) and a narrow bandwidth (referred to as an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL. Also, SC-FDMA can be applied to a side link (SL) that is used in inter-terminal communication.

DL channels that are used in radio communication system 1 include DL data channel that is shared by each user terminal 20 (also referred to as "PDSCH (Physical Downlink Shared CHannel)," "DL shared channel" and so forth), a broadcast channel (PBCH (Physical Broadcast CHannel)), L1/L2 control channels and so on. At least one of user data, higher layer control information and SIBs (System Information Blocks) is communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (A/N, HARQ-ACK, etc.) can be communicated in at least one of the PHICH, the PDCCH and the EPDCCH.

UL channels that are used in the radio communication system 1 include UL data channel that is shared by each user terminal 20 (also referred to as "PUSCH (Physical Uplink Shared CHannel)," "UL shared channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of PDSCH delivery acknowledgement information (A/N, HARQ-ACK, etc.), channel state information (CSI) and so on, is communicated in the PUSCH or the PUCCH. By means of the PRACH, random access preambles for establishing connections with cells are communicated.

(Radio Base Station)

Figure 9:
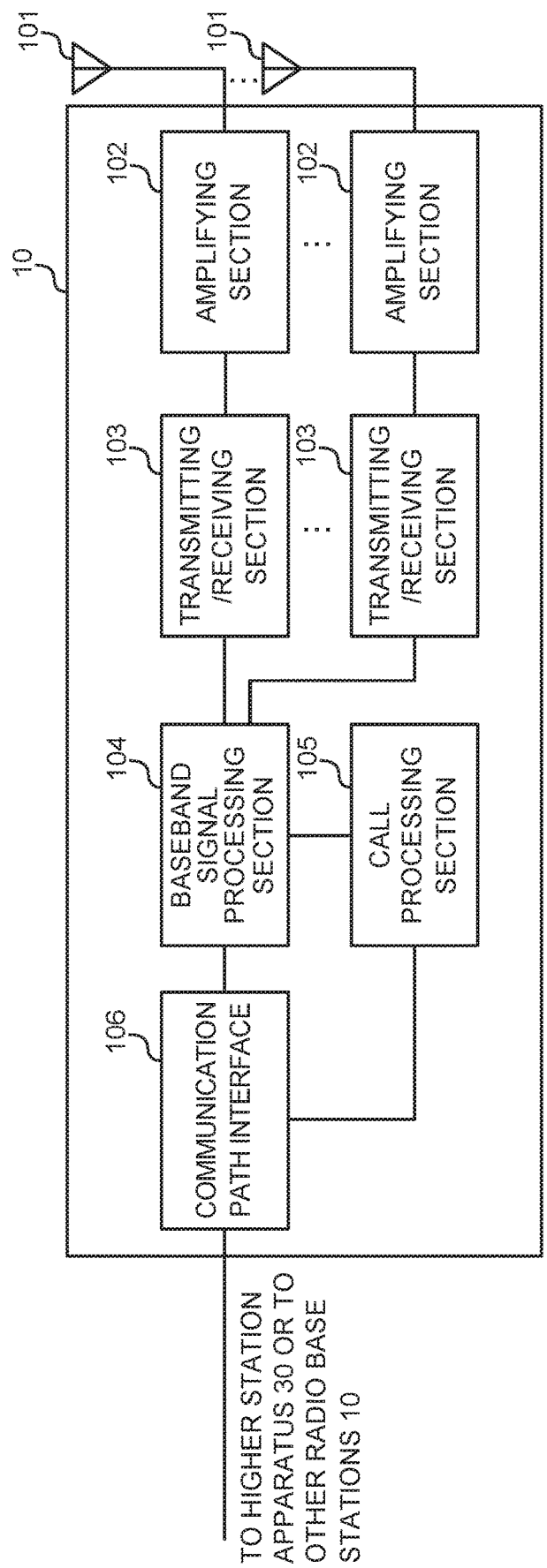
FIG. 9 is a diagram to show an exemplary overall structure of a radio base station according to the present invention.

FIG. 9 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to the transmitting/receiving sections 103. Furthermore, downlink control signals are also subjected to transmission processes such as channel coding and/or an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be designed as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

In addition, the transmitting/receiving sections 103 transmit DL signals (for example, at least one of DCI (DL assignment for scheduling DL data and/or UL grant for scheduling UL data), DL data and DL reference signals), and receive UL signals (for example, at least one of UL data, UCI, and UL reference signals).

In addition, the transmitting/receiving sections 103 receive delivery acknowledgment information (also referred to as "ACK/NACK," "A/N," "HARQ-ACK," "A/N code book," etc.) related to DL signals. This delivery acknowledgment information may be transmitted, for example, per CB, per CBG, per TB or for every one or more TBs (that is, ACKs or NACKs may be indicated per CB, per CBG, per TB or for every one or more TBs). In addition, the transmitting/receiving sections 103 may transmit configuration information for the unit of delivery acknowledgment information. In addition, the transmitting/receiving sections 103 may transmit configuration information for the unit for retransmission of DL signals and/or UL signals. In addition, the transmitting/receiving sections 103 may transmit information indicating the number of CBs per CBG.

Figure 10:
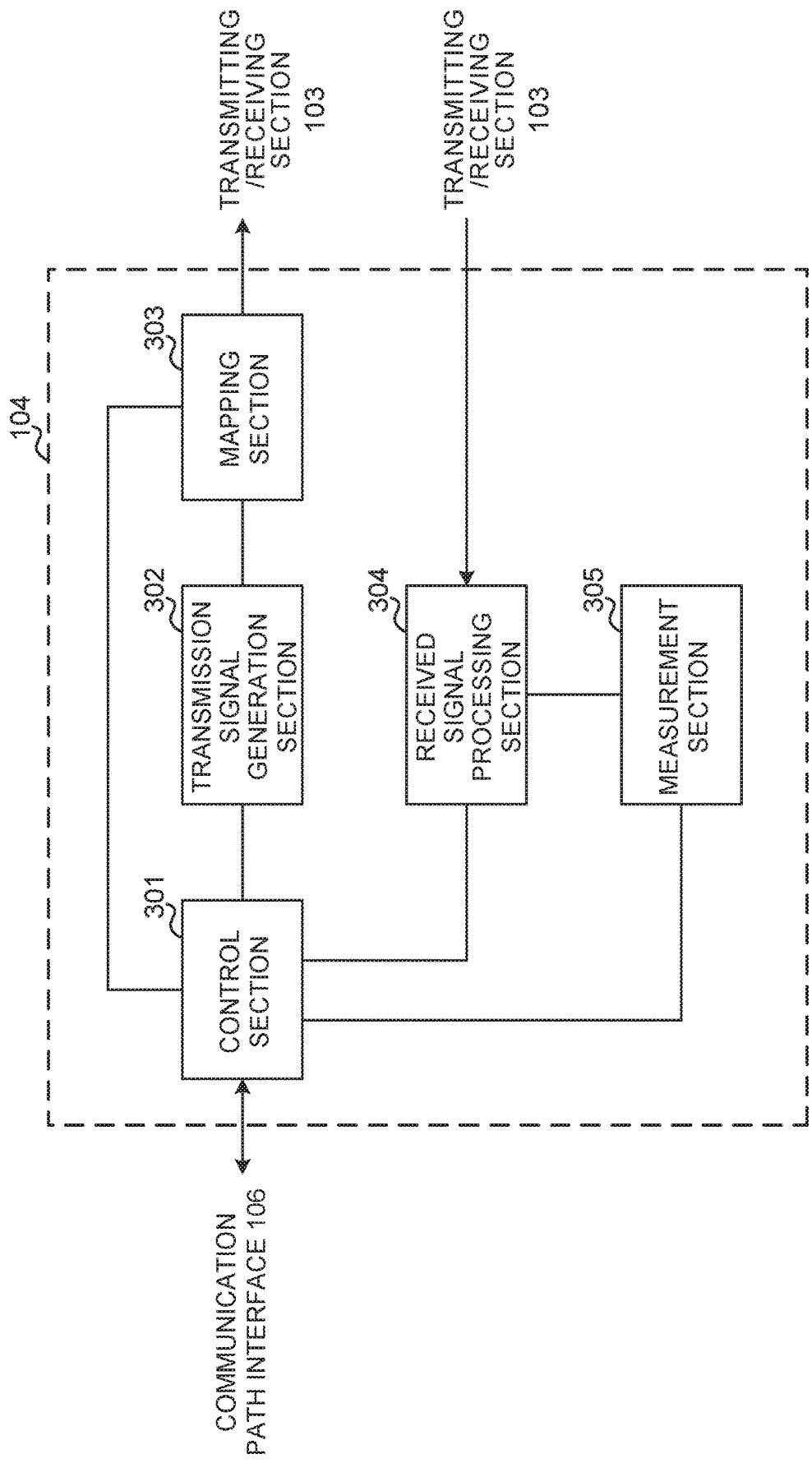
FIG. 10 is a diagram to show an exemplary functional structure of a radio base station according the present invention.

FIG. 10 is a diagram to show an exemplary functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section 301, a transmission signal generation section 302, a mapping section 303, a received signal processing section 304 and a measurement section 305. Note that the radio base station 10 may be referred to as a "transmitting device" when transmitting DL signals, and may be referred to as a "receiving device" when receiving UL signals.

The control section 301 controls the whole of the radio base station 10. The control section 301 controls, for example, at least one of the scheduling of DL signals and UL signals, DL signal generation processes in the transmission signal generation section 302 (for example, coding, modulation, etc.), the mapping of DL signals in the mapping section 303, UL signal receiving processes in the received signal processing section 304 (for example, demodulation/decoding, etc.) and measurements in the measurement section 305.

To be more specific, the control section 301 selects the modulation scheme and the TBS for DL signals based on channel quality indicators (CQIs) feedback from the user terminal 20. The control section 301 controls the transmission signal generation section 302 to encode DL signals based on the TBS and modulate DL signals based on the modulation scheme.

Also, when the TBS exceeds a predetermined threshold, the control section 301 may apply code block segmentation to DL signals, whereby a TBS is divided into multiple CBs. To be more specific, the control section 301 may control the transmission signal generation section 302 to perform coding and rate matching per CB, and control the mapping section 303 to map CWs, in which individual CBs are concatenated. Also, when the TBS exceeds a predetermined threshold, the control section 301 may apply code block segmentation to UL signals.

Also, the control section 301 may also control the size of CBs based on at least one of the number of PRBs (the number of resource blocks) allocated to a DL signal, the modulation scheme, the coding rate and the number of layers (first example). Furthermore, the control section 301 may control the coding length and/or the coding rate of CBs based on at least one of the number of PRBs allocated to a DL signal, the modulation scheme, the coding rate and the number of layers.

Alternatively, the control section 301 may control the coding of CBs by using a fixed coding length and/or coding rate regardless of at least one of the number of PRBs allocated to a DL signal, the modulation scheme, the coding rate and the number of layers (second example).

Furthermore, the control section 301 controls UL signal receiving processes (for example, demodulation, decoding, etc.). For example, the control section 301 may control the received signal processing section 304 to demodulate a UL signal based on the modulation scheme indicated by the MCS index designated in DCI (UL grant), select the TBS based on the TBS index indicated by the MCS index and the number of resource blocks allocated, and decode a DL signal based on this TBS.

Furthermore, the control section 301 controls UL signal receiving processes (for example, demodulation, decoding, etc.). For example, the control section 301 may control the received signal processing section 304 to demodulate a UL signal based on the modulation scheme indicated by the MCS index designated in DCI (UL grant), select the TBS based on the TBS index indicated by the MCS index and the number of resource blocks allocated, and decode a DL signal based on this TBS.

The control section 301 may also control the size of CBs based on at least one of the number of PRBs (the number of resource blocks) allocated to a UL signal, the modulation scheme, the coding rate and the number of layers (first example). Furthermore, the control section 301 may control the coding length and/or the coding rate of CBs based on at least one of the number of PRBs allocated to a UL signal, modulation scheme, the coding rate and the number of layers. In this case, the control section 301 may control the transmission (feedback) of delivery acknowledgment information within the slot in which the UL signal is allocated.

Alternatively, based on at least one of the number of PRBs allocated to a UL signal, the modulation scheme, the coding rate and the number of layers, the control section 301 may determine whether or not to transmit (as feedback) delivery acknowledgment information in a slot in which the UL signal is allocated (second example). Also, the control section 301 may control the decoding of CBs by using a fixed coding length and/or coding rate regardless of at least one of the number of PRBs allocated to a UL signal, the modulation scheme, the coding rate and the number of layers.

Furthermore, the control section 301 may control retransmission of DL signals based on delivery acknowledgment information from the user terminal 20. DL signals may be retransmitted in units of TBs, CBs or CBGs.

The control section 301 can be constituted by a controller, a control circuit or control apparatus that can be described based on general understanding of the technical field to which the present invention pertains.

The transmission signal generation section 302 may generate a DL signal (including at least one of DL data, DCI, a DL reference signal and control information that is provided by way of higher layer signaling) based on commands from the control section 301, and output this signal to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signal generated in the transmission signal generation section 302 to a radio resource, as commanded from the control section 301, and outputs this to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) for UL signals transmitted from the user terminal 20. For example, the received signal processing section 304 may perform the decoding process in units of CBs based on commands from the control section 301.

To be more specific, the received signal processing section 304 may output the received signals, the signals after the receiving processes and so on, to the measurement section 305. The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, RSRP (Reference Signal Received Power)), the received quality (for example, RSRQ (Reference Signal Received Quality)), channel states and so on of the received signals. The measurement results may be output to the control section 301.

(User Terminal)

Figure 11:
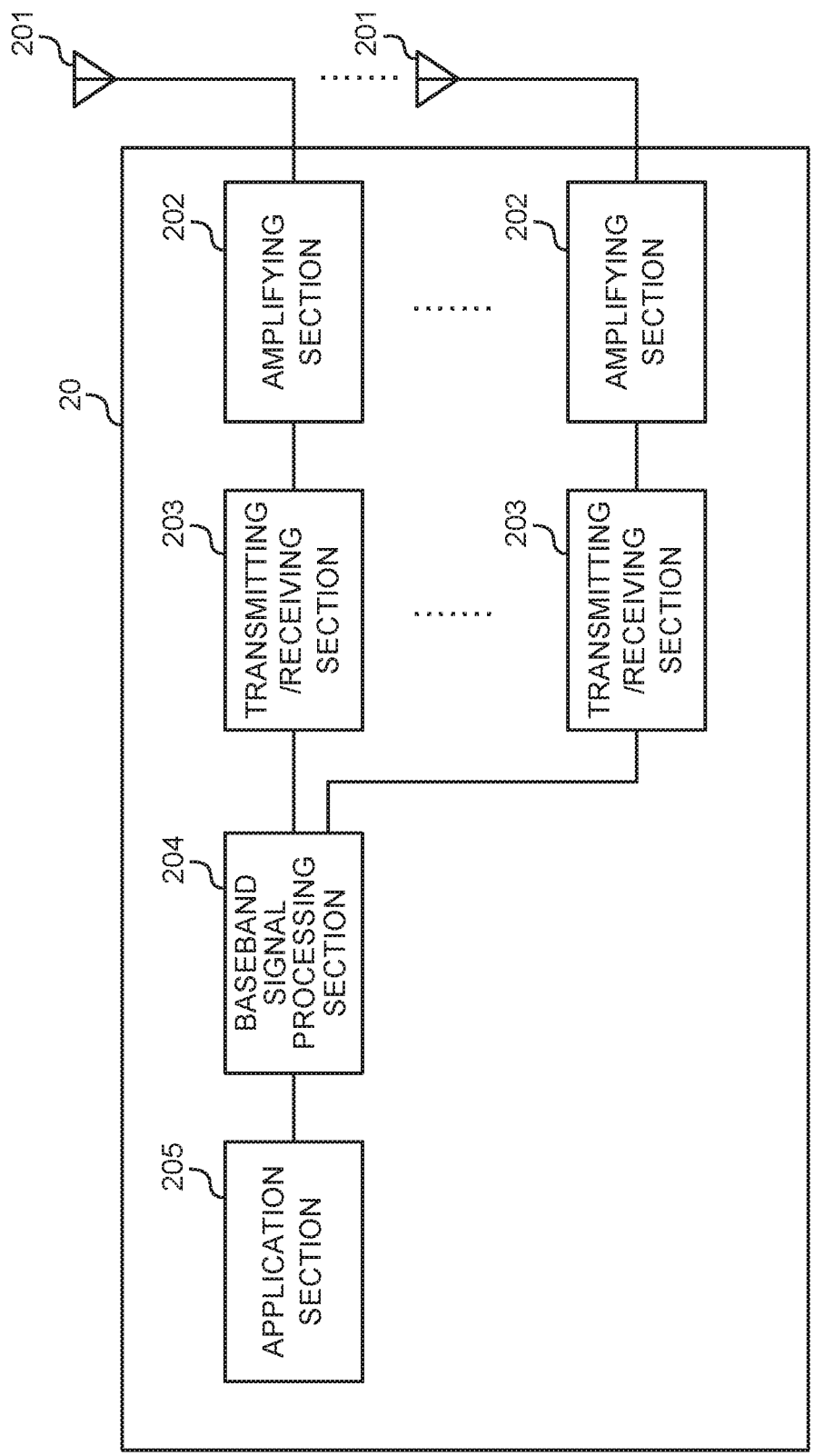
FIG. 11 is a diagram to show an exemplary overall structure of a user terminal according to the present invention.

FIG. 11 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving sections 203. UCI (including, for example, at least one of an A/N in response to a DL signal, channel state information (CSI) and a scheduling request (SR), and/or others) is also subjected to channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving section sections 203 receive DL signals (for example, at least one of DCI (DL assignment and/or UL grant), DL data and DL reference signals), and transmit UL signals (for example, at least one of UL data, UCI, and UL reference signals).

In addition, the transmitting/receiving sections 203 transmit delivery acknowledgment information in response to DL signals. As mentioned earlier, this delivery acknowledgment information may be transmitted, for example, per CB, per CBG, per TB or for every one or more TBs (that is, ACKs or NACKs may be indicated per CB, per CBG, per TB or for every one or more TBs). In addition, the transmitting/receiving sections 203 may receive configuration information for the unit of delivery acknowledgment information. In addition, the transmitting/receiving sections 203 may receive configuration information for the unit for retransmission of DL signals and/or UL signals. In addition, the transmitting/receiving sections 203 may receive information indicating the number of CBs per CBG.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 12:
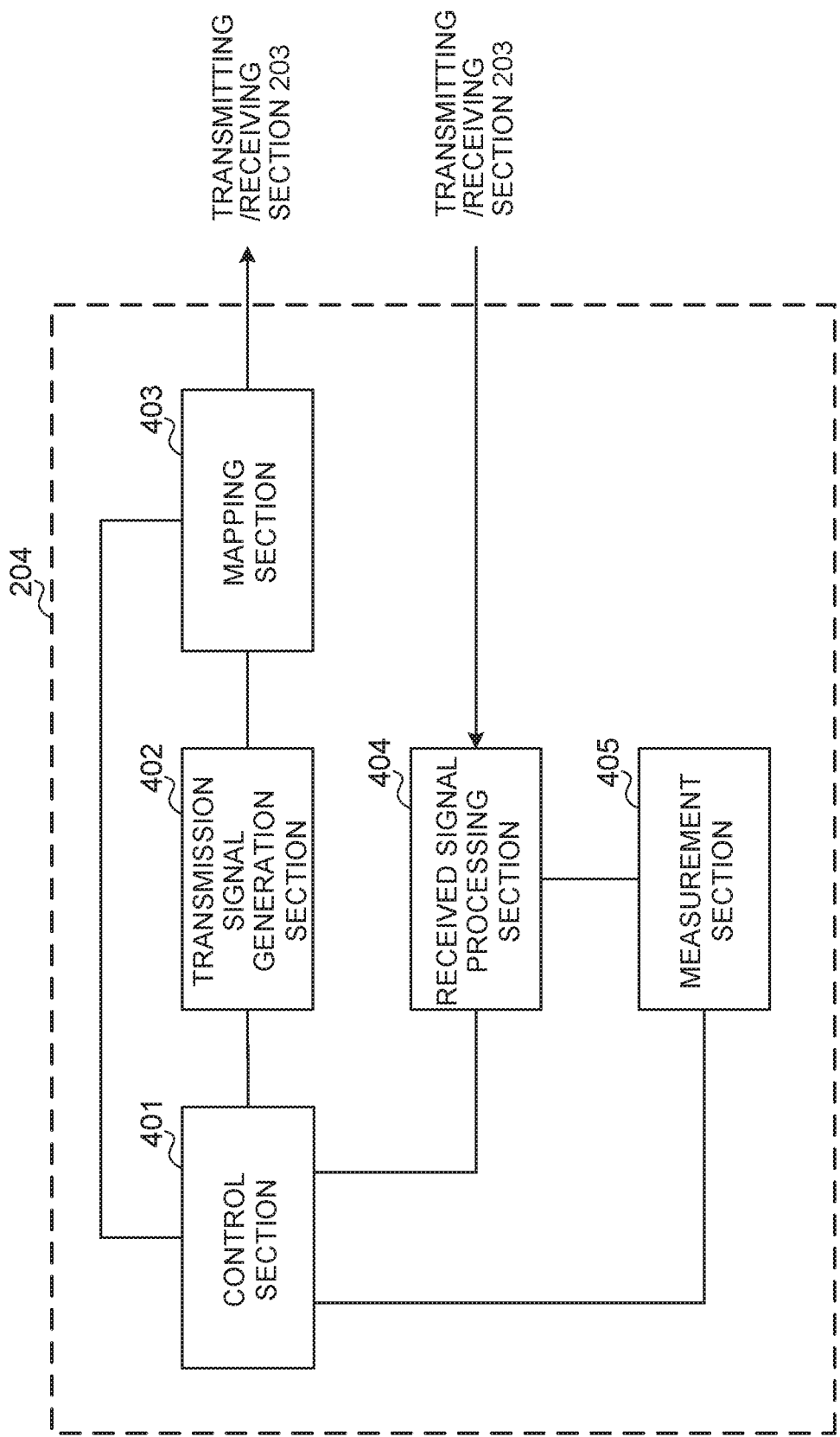
FIG. 12 is a diagram to show an exemplary overall structure of a user terminal according to the present invention.

FIG. 12 is a diagram to show an exemplary functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generation section 402, a mapping section 403, a received signal processing section 404 and a measurement section 405. Note that the user terminal 20 may be referred to as a "receiving device" when receiving DL signals, and may be referred to as a "transmitting device" when transmitting UL signals.

The control section 401 controls the whole of the user terminal 20. The control section 401 controls, for example, at least one of DL signal receiving processes in the received signal processing section 404, UL signal generation processes in the transmission signal generation section 402, mapping of UL signals in the mapping section 403 and measurements in the measurement section 405.

To be more specific, the control section 401 controls DL signal receiving processes (for example, demodulation/decoding, etc.) based on DCI (DL assignment). For example, the control section 401 may control the received signal processing section 404 to demodulate DL signals based on the modulation scheme indicated by the MCS index designated in DCI. Also, the control section 401 may control the received signal processing section 404 to select the TBS based on the TBS index indicated by the MCS index and the number of resource blocks allocated, and decode DL signals based on this TBS.

Also, the control section 401 may control the generation and/or transmission of delivery acknowledgment information in response to DL signals. To be more specific, the control section 401 may control the generation and/or transmission of delivery acknowledgment information that represents ACKs or NACKs per predetermined unit (for example, per CB or per CBG).

Also, the control section 401 may control the size of CBs based on at least one of the number of PRBs (the number of resource blocks) allocated to a DL signal, the modulation scheme, the coding rate and the number of layers (first example). Also, the control section 401 may control the coding length and/or the coding rate of CBs based on at least one of the number of PRBs allocated to a DL signal, the modulation scheme, the coding rate and the number of layers. In this case, the control section 401 may control the transmission (feedback) of delivery acknowledgment information within the slot in which the DL signal is allocated.

Alternatively, based on at least one of the number of PRBs allocated to a DL signal, the modulation scheme, the coding rate and the number of layers, the control section 401 may determine whether or not to transmit (as feedback) delivery acknowledgment information in a slot in which the DL signal is allocated (second example). Also, the control section 401 may control the decoding of CBs by using a fixed coding length and/or coding rate regardless of at least one of the number of PRBs allocated to a DL signal, the modulation scheme, the coding rate and the number of layers.

Also, the control section 401 controls the generation and transmission processes (for example, encoding, modulation, mapping etc.) of UL signals based on DCI (UL grant). For example, the control section 401 may control the transmission signal generation section 402 to modulate UL signals based on the modulation scheme that is indicated by the MCS index in DCI. Also, the control section 401 may control the transmission signal generation section 402 to determine the TBS based on the TBS index, which is indicated by the MCS index, and the number of resource blocks to allocate, and encode UL signals based on this TBS.

Also, when TBS exceeds a predetermined threshold, the control section 401 may apply code block segmentation, whereby a TBS is divided into multiple CBs, to UL signals. Alternatively, the control section 401 may apply code block segmentation to UL signals based on use commands given via higher layer signaling and/or DCI.

Also, the control section 401 may control the size of CBs based on at least one of the number of PRBs (the number of resource blocks) allocated to a UL signal, the modulation scheme, the coding rate and the number of layers (first example). Also, the control section 401 may control the coding length and/or the coding rate of CBs based on at least one of the number of PRBs allocated to a UL signal, the modulation scheme, the coding rate and the number of layers.

Alternatively, the control section 401 may control the coding of CBs by using a fixed coding length and/or coding rate, regardless of at least one of the number of PRBs allocated to a UL signal, the modulation scheme, the coding rate and the number of layers (second example).

The control section 401 can be constituted by a controller, a control circuit or control apparatus that can be described based on general understanding of the technical field to which the present invention pertains.

The transmission signal generation section 402 generates delivery acknowledgment information for UL signals and DL signals (including performing coding, rate matching, puncturing, modulation and/or other processes) as commanded from the control section 401, and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps delivery acknowledgment information for UL signals and DL signals generated in the transmission signal generation section 402, to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes for DL signals (for example, demapping, demodulation, decoding, etc.). For example, the received signal processing section 404 may perform the decoding process on a per CB basis as commanded from the control section 401, and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 13:
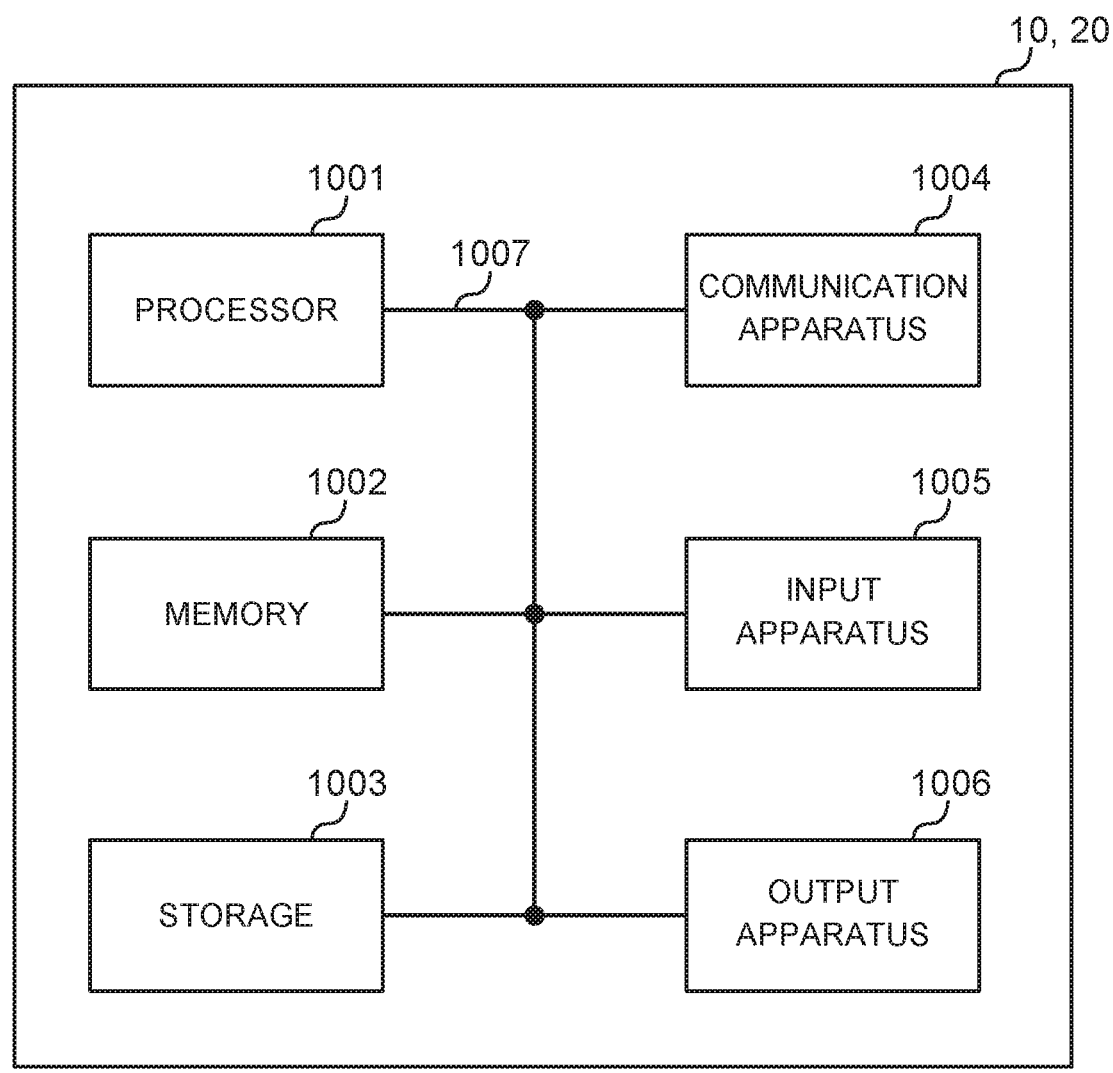
FIG. 13 is a diagram to show an exemplary hardware structure of a radio base station and a user terminal according to one embodiment of the present invention.

For example, the radio base station, user terminals and so on according to the present embodiment mode may function as a computer that executes the processes of the radio communication method of the present invention. FIG. 13 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and write data.

The processor 1001 may control the whole computer by, for example, running an operating system. The processor 1001 may be configured with a central processing unit (CPU), which includes interfaces with peripheral apparatus, control apparatus, computing apparatus, a register and so on.

For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an Light Emitting Diode (LED) lamp and so on). Note that the input apparatus 1005 and the output apparatus 1006 may be provided in an integrated structure (for example, a touch panel).

Also, each device shown in FIG. 13 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an Application- Specific Integrated Circuit (ASIC), a Programmable Logic Device (PLD), an Field Programmable Gate Array (FPGA) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be formed with one or more periods (frames) in the time domain. Each of one or more periods (frames) constituting a radio frame may be referred to as a "subframe." Furthermore, a subframe may be formed with one or more slots in the time domain. A subframe may be a fixed time length (for example, 1 ms) not dependent on the numerology.

A slot may be formed with one or more symbols in the time domain (Orthogonal Frequency Division Multiplexing (OFDM) symbols, Single Carrier Frequency Division Multiple Access (SC-FDMA) symbols, and so on). Also, a slot may be a time unit based on numerology. Also, a slot may include a plurality of minislots. Each minislot may be formed with one or more symbols in the time domain.

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this. The TTI may be the transmission time unit of channel-encoded data packets (transport blocks), code blocks and/or codewords, or may be the unit of processing in scheduling, link adaptation and so on. Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be formed with one or more resource blocks. Note that an RB may be referred to as a "physical resource block (Physical RB (PRB))," a "PRB pair," an "RB pair," and so on.

Furthermore, a resource block may be formed with one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (Physical Uplink Control CHannel (PUCCH), Physical Downlink Control CHannel (PDCCH) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, Radio Resource Control (RRC) signaling, broadcast information (the master information block (MIB), system information blocks (SIBs) and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (Device-to-Device (D2D)). In this case, user terminals 20 may have the functions of the radio base stations 10 described above. In addition, "uplink" and/or "downlink" may be interpreted as "sides." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network formed with one or more network nodes with base stations, it is clear that various operations that are performed to communicate with terminals can be performed by base stations, one or more network nodes (for example, Mobility Management Entities (MMEs), Serving-Gateways (S-GW), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), New Radio (NR), New radio access (NX), Future generation radio access (FX), Global System for Mobile communications (GSM(registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A receiving device comprising:
a receiver that receives one or more code blocks mapped per given number of symbols, in a slot in which a data signal is scheduled; and
a processor that controls transmission of delivery acknowledgment information in response to the data signal in the slot, based on decoding results of the code blocks mapped per given number of symbols,
wherein the processor controls a size of the code blocks based on a maximum code block size in accordance with a coding scheme and at least one of a number of resource blocks allocated to the data signal, a modulation scheme, a coding rate, and a number of layers,
wherein the processor controls a coding length and/or the coding rate of the code blocks based on at least one of the number of resource blocks allocated to the data signal, the modulation scheme, the coding rate, and the number of layers,
wherein the processor determines whether or not to transmit the delivery acknowledgment information in the slot based on at least one of the number of resource blocks allocated to the data signal, the modulation scheme, the coding rate, and the number of layers, and
wherein the processor controls a coding length and a coding rate of the code block regardless of at least one of the number of resource blocks allocated to the data signal, the modulation scheme, the coding rate, and the number of layers.

2. A radio communication method comprising, in a receiving device:
receiving one or more code blocks mapped per given number of symbols, in a slot in which a data signal is scheduled; and
controlling transmission of delivery acknowledgment information in response to the data signal in the slot, based on decoding results of the code blocks mapped per given number of symbols,
wherein the receiving device controls a size of the code blocks based on a maximum code block size in accordance with a coding scheme and at least one of a number of resource blocks allocated to the data signal, a modulation scheme, a coding rate, and a number of layers,
wherein the receiving device controls a coding length and/or the coding rate of the code blocks based on at least one of the number of resource blocks allocated to the data signal, the modulation scheme, the coding rate and the number of layers,
wherein the receiving device determines whether or not to transmit the delivery acknowledgment information in the slot based on at least one of the number of resource blocks allocated to the data signal, the modulation scheme, the coding rate, and the number of layers, and
wherein the receiving device controls a coding length and a coding rate of the code block regardless of at least one of the number of resource blocks allocated to the data signal, the modulation scheme, the coding rate, and the number of layers.

* * * * *